United States Patent
Igarashi et al.

(10) Patent No.: US 9,229,762 B2
(45) Date of Patent: Jan. 5, 2016

(54) HOST PROVIDING SYSTEM AND HOST PROVIDING METHOD

(71) Applicant: NTT DOCOMO, INC., Chiyoda-ku (JP)

(72) Inventors: Ken Igarashi, Chiyoda-ku (JP); Mana Kaneko, Chiyoda-ku (JP); Makoto Sasaki, Chiyoda-ku (JP); Satoru Imai, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 14/383,331

(22) PCT Filed: Jan. 24, 2013

(86) PCT No.: PCT/JP2013/051439
§ 371 (c)(1),
(2) Date: Sep. 5, 2014

(87) PCT Pub. No.: WO2013/132910
PCT Pub. Date: Sep. 12, 2013

(65) Prior Publication Data
US 2015/0317174 A1    Nov. 5, 2015

(30) Foreign Application Priority Data
Mar. 7, 2012 (JP) .................. 2012-050704

(51) Int. Cl.
*G06F 9/46* (2006.01)
*G06F 9/455* (2006.01)
(52) U.S. Cl.
CPC .... *G06F 9/45558* (2013.01); *G06F 2009/4557* (2013.01); *G06F 2009/45595* (2013.01)

(58) Field of Classification Search
CPC .................................................... G06F 9/45558
USPC .................................................... 718/101–108
See application file for complete search history.

(56) References Cited

U.S. PATENT DOCUMENTS

| 5,124,909 A  | * | 6/1992 | Blakely ................. | G06F 9/4425 707/E17.006 |
| 8,478,952 B1 | * | 7/2013 | Armorer ............. | G06F 11/1464 711/111 |

(Continued)

FOREIGN PATENT DOCUMENTS

| JP | 2003 16043 | 1/2003 |
| JP | 2008 269250 | 11/2008 |

OTHER PUBLICATIONS

Teraoka, Fumio, et al. "VIP: A protocol providing host mobility." Communications of the ACM 37.8 (1994): pp. 67-113.*

(Continued)

*Primary Examiner* — Satish Rampuria
(74) *Attorney, Agent, or Firm* — Oblon, McClelland, Maier & Neustadt, L.L.P.

(57) ABSTRACT

A host providing system includes a physical host managing node which controls one or more physical servers and can manage a usage state of a physical host formed in the physical server, and thus the physical server for forming a physical host can be controlled in the system. In addition, a single physical host managing node is selected depending on instance type information included in an instance starting request from a user terminal, and the instance starting request is sent to the selected physical host managing node. Accordingly, it is possible to provide a physical instance complying with a user's request as a physical host.

14 Claims, 11 Drawing Sheets

(56) References Cited

U.S. PATENT DOCUMENTS

| | | | | |
|---|---|---|---|---|
| 2007/0180450 A1* | 8/2007 | Croft | .................... | G06F 3/1415 |
| | | | | 718/1 |
| 2011/0282965 A1* | 11/2011 | Dodson | ................. | G06Q 10/00 |
| | | | | 709/217 |
| 2013/0179656 A1* | 7/2013 | Lemay | .................... | G06F 12/02 |
| | | | | 711/165 |

OTHER PUBLICATIONS

Fitzgerald, S., Foster, I., Kesselman, C., Von Laszewski, G., Smith, W., & Tuecke, S. (Aug. 1997). A directory service for configuring high-performance distributed computations. In High Performance Distributed Computing, 1997. Proceedings. The Sixth IEEE International Symposium on (pp. 365-375). IEEE.*

Magee, Jeff, et al. "Specifying distributed software architectures." Software Engineering—ESEC'95. Springer Berlin Heidelberg, 1995. pp. 137-153.*

International Preliminary Report on Patentability and Written Opinion issued Sep. 18, 2014 in PCT/JP2013/051439.

"The openQRM Datacenter Management and Cloud Computing Platform", URL: http://openstack.org/, pp. 1-68, (Feb. 17, 2012).

Japanese Office Action Issued Dec. 3, 2013 in JP Patent Application No. P2012-050704 Filed Mar. 7, 2012 (with English translation).

International Search Report Issued Mar. 12, 2013 in PCT/JP13/051439 Filed Jan. 24, 2013.

* cited by examiner

*Fig.3*

| INSTANCE TYPE | NUMBER OF NECESSARY CPUS | NECESSARY MEMORY CAPACITY | NECESSARY DISK CAPACITY |
|---|---|---|---|
| PHYSICAL | 4 | 3000 | 100 |

Fig.4

| INSTANCE TYPE | HOST MANAGING NODE ID | UPDATE TIME |
|---|---|---|
| VIRTUAL | VNC-1 | t1 |
| VIRTUAL | VNC-2 | t2 |
| PHYSICAL | PNC-1 | t3 |
| PHYSICAL | PNC-2 | t4 |
| PHYSICAL | PNC-3 | t5 |
| ⋮ | ⋮ | ⋮ |

Fig.5

| HOST MANAGING NODE ID | TOTAL NUMBER OF CPUS | TOTAL MEMORY | TOTAL DISK CAPACITY | NUMBER OF USE CPUS | USE MEMORY | USE DISK CAPACITY |
|---|---|---|---|---|---|---|
| VNC-1 | 16 | 32228 | 243 | 4 | 1500 | 50 |
| VNC-2 | 8 | 32228 | 102 | 0 | 1000 | 10 |
| ... | ... | ... | ... | ... | ... | ... |

Fig.6

| HOST MANAGING NODE ID | PHYSICAL HOST ID | INSTANCE ID | TOTAL NUMBER OF CPUS | TOTAL MEMORY | TOTAL DISK CAPACITY | IP ADDRESS | MAC ADDRESS | ... |
|---|---|---|---|---|---|---|---|---|
| PNC-1 | 1001 | 111 | 16 | 32228 | 243 | | | |
| PNC-1 | 1002 | 112 | 8 | 32228 | 102 | | | |
| PNC-1 | 1003 | — | 4 | 4096 | 100 | | | |
| PNC-2 | 1004 | 113 | 8 | 32228 | 102 | | | |
| PNC-2 | 1005 | — | 8 | 32228 | 102 | | | |
| PNC-3 | 1006 | — | 8 | 32228 | 102 | | | |
| PNC-3 | 1007 | — | 4 | 4096 | 100 | | | |
| ... | ... | ... | ... | ... | ... | ... | ... | ... |

*Fig.7*

| INSTANCE TYPE | HOST MANAGING NODE ID |
|---|---|
| VIRTUAL | VNC-1 |
| VIRTUAL | VNC-2 |
| PHYSICAL | PNC-1 |
| PHYSICAL | PNC-2 |
| PHYSICAL | PNC-3 |
| ⋮ | ⋮ |

Fig.8

| INSTANCE TYPE | HOST MANAGING NODE ID |
|---|---|
| PHYSICAL | PNC-1 |
| PHYSICAL | PNC-2 |
| PHYSICAL | PNC-3 |

Fig.9

| HOST ID | INSTANCE ID | HOST MANAGING NODE ID | NUMBER OF CPUS | MEMORY | DISK CAPACITY | IP ADDRESS | MAC ADDRESS | ... |
|---|---|---|---|---|---|---|---|---|
| 1010 | — | PNC-3 | 2 | 1024 | 100 | | | |
| 1011 | — | PNC-3 | 4 | 2048 | 100 | | | |
| 1012 | — | PNC-3 | 4 | 4096 | 200 | | | |
| 1013 | — | PNC-3 | 8 | 32228 | 400 | | | |

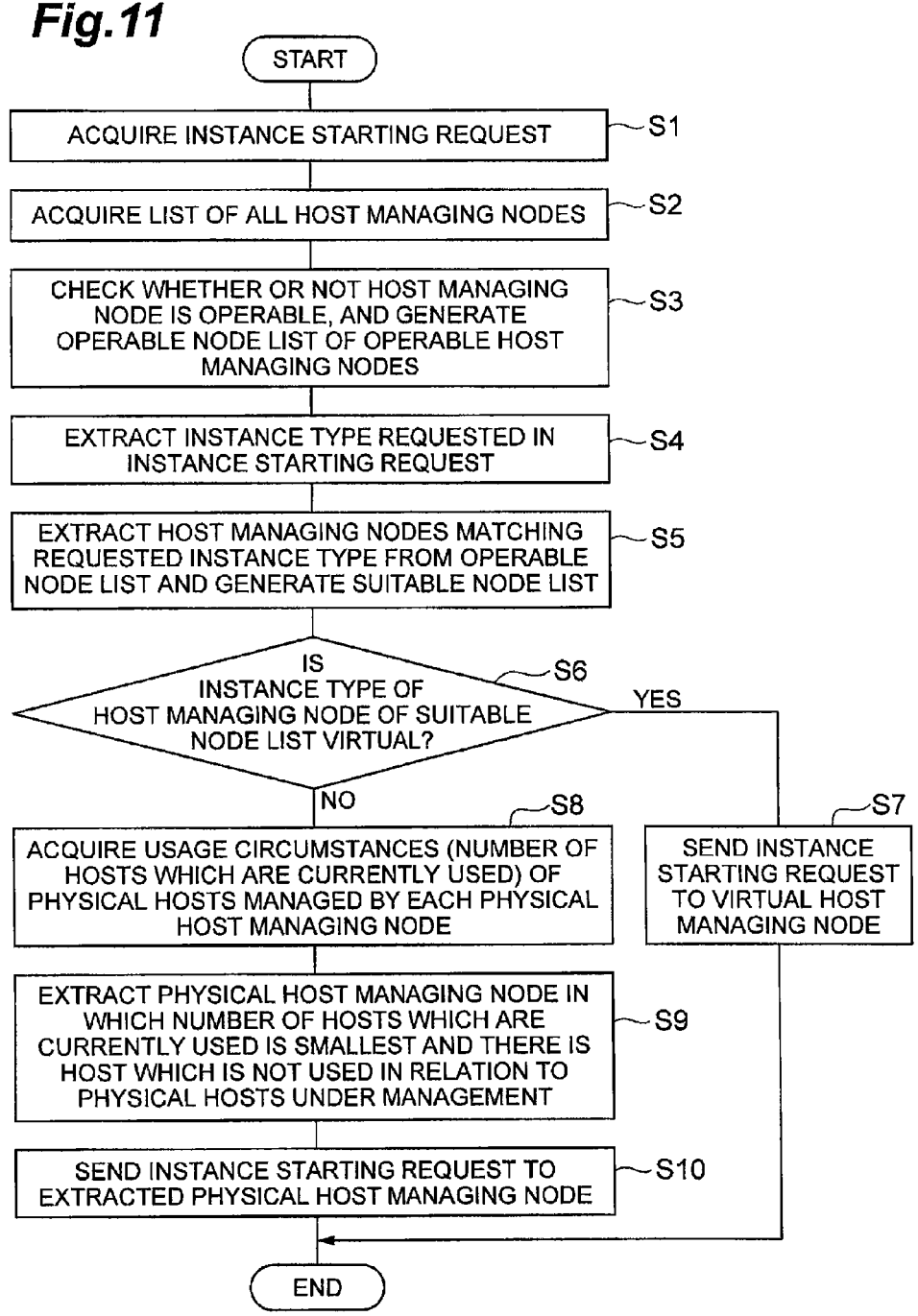

HOST PROVIDING SYSTEM AND HOST PROVIDING METHOD

TECHNICAL FIELD

The present invention relates to a host providing system and a host providing method.

BACKGROUND ART

In recent years, a service has been conducted in which resources which are required to build and operate an information system are provided via the Internet. This service is called, for example, Infrastructure as a Service (Iaas). A technique is known in which a plurality of virtual instances are formed in a single physical server, and the virtual instances are provided to users as virtual host computers (for example, refer to Non-Patent Literature 1). In this technique, each physical server has a function of selecting, starting, and managing a virtual instance which has a performance complying with a request from a user. In addition, the instance refers to a set of resources such as a CPU, a memory, and a storage.

CITATION LIST

Non Patent Literature

[Non-Patent Literature 1] "open stack", [online], [searched on Feb. 17, 2012], the Internet <URL: http://openstack.org/>

SUMMARY OF INVENTION

Technical Problem

In the above-described technique, an instance which can be treated is only a virtual instance. In the virtual instance, overhead occurs due to a virtually configured instance. Deterioration in performance occurs due to the overhead depending on the kind of application used by a user. For this reason, there is a demand for providing a physical instance in order to operate an application in which performance deterioration occurs when the virtual instance is used, in a service such as has. In addition, there is a demand for a technique for suitably operating and managing a physical instance in compliance with requests from users.

Therefore, the present invention has been made in consideration of the above-described problems, and an object thereof is to provide a host providing system and a host providing method capable of suitably providing a physical instance complying with a user's request in a system which provides hardware resources via a network.

Solution to Problem

In order to solve the problem, according to an aspect of the present invention, there is provided a host providing system providing an instance constituted by predetermined hardware resources to a user terminal as a host computer so that the instance can be used, in compliance with a request from a user terminal, including one or more servers which can virtually form a plurality of virtual instances in a corresponding server and provide the virtual instance as a virtual host, and including one or more physical servers which provide a physical instance that is physically formed alone in the physical server as a physical host, the system including request receiving means for receiving an instance starting request which is a starting request of the instance from the user terminal and includes instance type information indicating whether an instance related to the starting request is either the virtual instance or the physical instance, from the user terminal; host information storage means for storing information regarding a state of a host; a plurality of physical host managing means for controlling the one or more physical servers, and storing physical host information including usage state information indicating a usage state of the physical host formed in the physical server under the control thereof, in the host information storage means; virtual host managing means, formed in a server providing the virtual host, for storing virtual host information including information indicating a usage state of the virtual host in the host information storage means; selecting means for selecting one of the physical host managing means on the basis of usage state information included in the physical host information from each of the physical host managing means, stored in the host information storage means, when the instance type information included in the instance starting request received by the request receiving means indicates a physical instance; and starting request sending means for sending the instance starting request to the physical host managing means selected by the selecting means.

In addition, in order to solve the problem, according to an aspect of the present invention, there is provided a host providing method in a host providing system providing an instance constituted by predetermined hardware resources to a user terminal as a host computer so that the instance can be used, in compliance with a request from a user terminal, including one or more servers which can virtually form a plurality of virtual instances in a corresponding server and provide the virtual instance as a virtual host, and including one or more physical servers which provide a physical instance that is physically formed alone in the physical server as a physical host, the method including a request receiving step of receiving an instance starting request which is a starting request of the instance from the user terminal and includes instance type information indicating whether an instance related to the starting request is either the virtual instance or the physical instance, from the user terminal; a selecting step of selecting one of the physical host managing means on the basis of usage state information included in physical host information from each of the physical host managing means, stored in the host information storage means, when the instance type information included in the instance starting request received in the request receiving step indicates a physical instance; and a starting request sending step of sending the instance starting request to the physical host managing means selected in the selecting step, in which the host providing system includes the host information storage means for storing information regarding a state of a host; the plurality of physical host managing means for controlling the one or more physical servers, and storing physical host information including usage state information indicating a usage state of the physical host formed in the physical server under the control thereof, in the host information storage means; and the virtual host managing means, formed in a server providing the virtual host, for storing virtual host information including information indicating a usage state of the virtual host in the host information storage means.

According to the aspect, the physical host managing means is provided which controls one or more physical servers and can manage a usage state of a physical host formed in the physical server, and thus the physical server for forming a physical host can be controlled in the system. In addition, according to the aspect, in a case where the instance type information included in the instance starting request from the user terminal indicates a physical instance, one of the physical host managing means which controls a physical server where the physical instance is formed alone is selected, and the instance starting request is sent to the selected physical host managing means, depending on usage circumstances of the physical hosts. Accordingly, since a physical instance formed in a physical server under the control of the physical host managing means is started as a physical host, it is possible to provide a physical instance complying with a user's request as a physical host.

In the host providing system according to another aspect, the instance starting request may include necessary performance information indicating a performance of hardware which is necessary in an instance; the physical host information may include host performance information indicating a performance of hardware of a physical instance forming a corresponding physical host; the host providing system may further include host selecting means for selecting a physical host having a performance satisfying the necessary performance information included in the instance starting request received by the request receiving means from among the physical hosts which are controlled by the physical host managing means selected by the selecting means, by referring to the host performance information of the physical host information stored in the host information storage means; and the starting request sending means may send the instance starting request for starting the physical host selected by the host selecting means to the physical host managing means selected by the host selecting means.

In the host providing method according to another aspect, the instance starting request may include necessary performance information indicating a performance of hardware which is necessary in an instance; the physical host information may include host performance information indicating a performance of hardware of a physical instance forming a corresponding physical host; the host providing method may further include a host selecting step of selecting a physical host having a performance satisfying the necessary performance information included in the instance starting request received in the request receiving step from among the physical hosts which are controlled by the physical host managing means selected in the selecting step, by referring to the host performance information of the physical host information stored in the host information storage means; and, in the starting request sending step, the instance starting request for starting the physical host selected in the host selecting step may be sent to the physical host managing means selected in the selecting step.

According to the aspect, it is possible to select a physical host satisfying a performance indicated by the necessary performance information included in the instance starting request, and to provide the selected physical host to the user terminal as a usable host computer.

In the host providing system according to still another aspect, the selecting means selects physical host managing means in which the number of physical hosts which are provided to a user terminal as host computers and are currently used is the smallest among the physical hosts under the control thereof, by referring to the usage state information included in the physical host information stored in the host information storage means.

In this aspect, since the physical host managing means in which the number of physical hosts which are currently used under the control thereof is the smallest is selected, the physical host managing means which is in a low load state is selected. Therefore, selection of the proper physical host managing means is realized, and load sharing of the entire system is realized.

In the host providing system according to still another aspect, the instance starting request may include necessary performance information indicating a performance of hardware which is necessary in an instance; the physical host information may include host performance information indicating a performance of hardware of a physical instance forming a corresponding physical host; and the selecting means may select physical host managing means which has physical hosts that satisfy a performance indicated by the host performance information under the control thereof and that are not used, and in which the number of physical hosts which are provided to a user terminal as host computers and are currently used is the largest among the physical hosts under the control thereof, by referring to the usage state information and the host performance information included in the physical host information stored in the host information storage means.

In the host providing system according to still another aspect, the instance starting request may include at least one of the number of CPUs, a memory capacity, and a storage capacity, which are necessary in an instance, as necessary performance information, and the physical host information may include at least one of the number of CPUs, a memory capacity, and a storage capacity forming a corresponding physical host, as host performance information.

According to the aspect, a request for a physical host from a user can be defined in detail, and a physical host finely matching the request can be provided.

In the host providing system according to still another aspect, the selecting means may select one of the virtual host managing means on the basis of the virtual host information stored in the host information storage means, when the instance type information included in the instance starting request received by the request receiving means indicates a physical instance, and the starting request sending means may send the instance starting request to the virtual host managing means selected by the selecting means.

According to the aspect, since one of the virtual host managing means is selected when the instance type information included in the instance starting request from a user terminal indicates a virtual instance, and the instance starting request is sent to the selected virtual host managing means, a virtual instance formed in a server including the virtual host managing means can be provided to a user as a virtual host. Therefore, a physical instance and a virtual instance can be present in the system in a mixed manner.

Advantageous Effects of Invention

According to an aspect of the present invention, it is possible to suitably provide a physical instance complying with a user's request in a system which provides hardware resources via a network.

BRIEF DESCRIPTION OF DRAWINGS

FIG. 3 is a diagram schematically illustrating a configuration of an instance starting request.

FIG. 4 is a diagram illustrating a configuration of host managing node information and an example of stored data in a host information storage unit.

FIG. 5 is a diagram illustrating a configuration of virtual host information and an example of stored data in the host information storage unit.

FIG. 6 is a diagram illustrating a configuration of physical host information and an example of stored data in the host information storage unit.

FIG. 7 is a diagram illustrating an example of an operable node list generated by a host managing node selecting unit.

FIG. 8 is a diagram illustrating an example of a suitable node list generated by a host managing node selecting unit.

FIG. 9 is a diagram illustrating an example of physical host information.

FIG. 11 is a flowchart illustrating process content of the host providing system in a host providing method.

DESCRIPTION OF EMBODIMENTS

Figure 1:
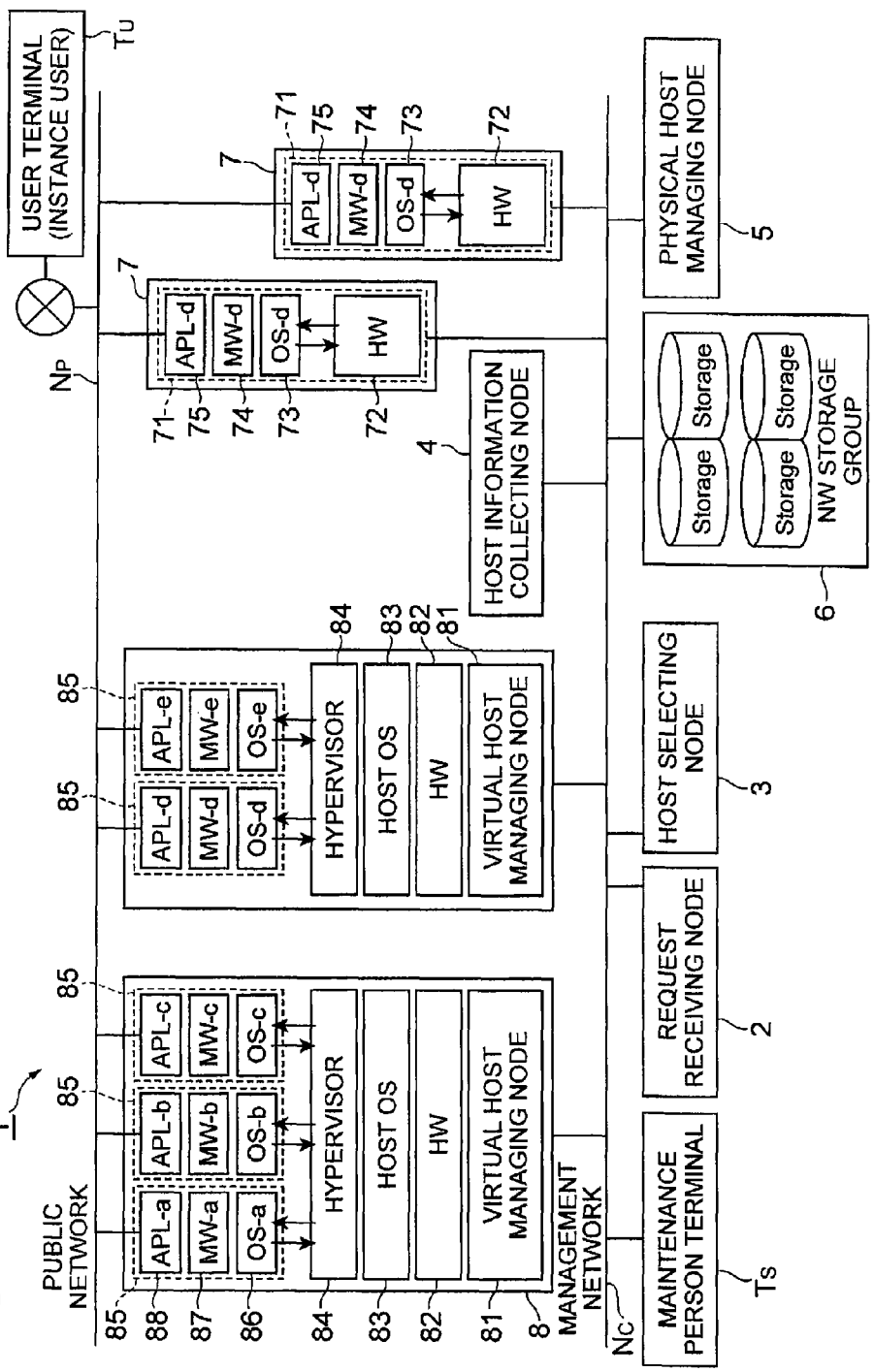
FIG. 1 is a block diagram illustrating a configuration of a host providing system.

Embodiments of a host providing system and a host providing method according to the present invention will be described with reference to the drawings. In addition, if possible, the same reference numerals are given to the same parts, and repeated description will be omitted.

FIG. 1 is a block diagram illustrating an entire configuration of a host providing system 1. The host providing system 1 is a system which provides an instance constituted by predetermined hardware resources to a user terminal as a host computer so that the instance can be used, in compliance with a request from the user terminal $T_U$.

The host providing system 1 includes a request receiving node 2, a host selecting node 3, a host information collecting node 4, a physical host managing node 5 (physical host managing means), an NW storage group 6, a first server 7, and a second server 8. The nodes and servers can communicate with each other via a management network $N_C$.

A maintenance person terminal $T_S$ is connected to the management network $N_C$ so as to communicate therewith, and a maintenance person of the system accesses the various nodes and servers via the maintenance person terminal $T_S$ so as to perform maintenance and management of the system.

In addition, the first server 7 and the second server 8 are connected to a public network $N_P$ so as to communicate therewith. The user terminal $T_U$ is connected to the public network $N_P$ so as to communicate therewith, and a user using an instance can access an instance formed in the first server 7 and the second server 8 via the user terminal $T_U$. Therefore, the user terminal $T_U$ can use the instance as a host computer.

The first server 7, the second server 8, and the NW storage group 6 will be described prior to description of the various nodes. The first server 7 is a physical server which forms a physical instance 71 alone in the first server 7. A single first server 7 can provide a single physical instance 71 to the user terminal $T_U$ as a physical host. The physical instance 71 includes hardware 72, an OS 73, middleware 74, and, an application 75.

The second server 8 is a physical server which virtually forms a plurality of virtual instances 85 in the second server 8, and can provide the plurality of virtual instances 85 to the user terminal $T_U$ as virtual hosts. The virtual instance 85 includes an OS 86, middleware 87, and an application 88. The second server 8 further includes a virtual host managing node 81 (virtual host managing means), hardware 82, a host OS 83, and a hypervisor 84.

The virtual host managing node 81 is a node which manages a plurality of virtual hosts, and stores virtual host information including information indicating a usage state of a virtual host in the host information collecting node 4. In addition, when an instance starting request is acquired from the host selecting node 3, the virtual host managing node 81 causes the hypervisor 84 to start any one of the plurality of virtual instances 85 as a virtual host. The hypervisor 84 is a functional unit which performs selection, management, starting, and the like of the virtual instance 85 which is provided as a virtual host.

The NW storage group 6 is a set of storage devices which are provided to the user terminal $T_U$ along with a host, and is accessed by the physical instance 71 and the virtual instance 85 in order to read and write data.

In addition, in FIG. 1, each of the various nodes 2 to 5 is distributed to the management network $N_C$ and is thus configured as a standalone device, but a plurality of nodes may be configured in a single device altogether. Further, FIG. 1 illustrates an aspect in which the two first servers 7 are managed by the single physical host managing node 5, but the number of first servers 7 and the number of physical host managing nodes 5 managing the servers are not limited to the number illustrated in FIG. 1 and are arbitrary. Next, with reference to FIG. 2, functions of the various nodes will be described.

FIG. 2(a) is a block diagram illustrating a functional configuration of the request receiving node 2. The request receiving node 2 includes a request receiving unit 21 (request receiving means) and a request sending unit 22.

The request receiving unit 21 is a part which receives an instance starting request from a user terminal, from the user terminal $T_U$. The instance starting request includes instance type information indicating whether an instance related to the starting request is a virtual instance or a physical instance. FIG. 3 is a diagram schematically illustrating a configuration of the instance starting request. As illustrated in FIG. 3, the instance type information is included. In an example illustrated in FIG. 3, the instance type information indicates a physical instance. In addition, the instance starting request may include necessary performance information indicating a hardware performance which is necessary in an instance, such as the number of necessary CPUs, a necessary memory capacity, and a necessary disk capacity.

The request sending unit 22 is a part which sends the instance starting request received by the request receiving unit 21, to the host selecting node 3.

Next, a function of the host information collecting node 4 will be described with reference to FIG. 2(c) prior to FIG. 2(b). FIG. 2(c) is a block diagram illustrating a functional configuration of the host information collecting node 4. The host information collecting node 4 includes a host information receiving unit 41 and a host information storage unit 42 (host information storage means).

The host information receiving unit 41 is a part which receives host information regarding a host state, receives physical host information from the physical host managing node 5, and receives a virtual host information from the virtual host managing node 81. The host information includes usage state information indicating a usage state of a host. In addition, the host information includes the type of instance of a host which is controlled and managed by a corresponding host managing node, information for determining whether or not each host is currently used, and information regarding a specification indicating a performance of a host. The host information receiving unit 41 stores the received host information in the host information storage unit 42. Further, the host information receiving unit 41 receives host managing node information regarding the physical host managing node 5 and the virtual host managing node 81 from the respective host managing nodes 5 and 81, and stores the information in the host information storage unit 42.

The host information storage unit 42 is a part which stores the host managing node information and the host information. FIGS. 4 to 6 are diagrams illustrating configurations of the host information storage unit 42 and examples of stored data. FIG. 4 is a diagram illustrating a configuration of the host managing node information and an example of included data. As illustrated in FIG. 4, the host information storage unit 42 stores an instance type, a host managing node ID for managing and identifying the host managing nodes 5 and 81 in an integrated fashion, and an update time when a corresponding host managing node updates host information as the host managing node information in correlation with each other.

FIG. 5 is a diagram illustrating a configuration of the virtual host information and an example of included data. As illustrated in FIG. 5, the host information storage unit 42 stores information indicating a state of the virtual host managing node 81. The host information storage unit 42 stores a total number of CPUs, a total memory, a total disk capacity, the number of use CPUs, a use memory, and a use disk capacity, for each host managing node ID for identifying the virtual host managing node 81, as the virtual host information in correlation with each other.

FIG. 6 is a diagram illustrating a configuration of the physical host information and an example of included data. As illustrated in FIG. 6, the host information storage unit 42 stores a physical host managing node ID of the physical host managing node 5 managing a corresponding physical host, a physical host ID for identifying a physical host formed in the first server, an instance ID, a total number of CPUs included in the first server, a total memory, a total disk capacity, an IP address, a MAC address, and the like, as the physical host information in correlation with each other. The instance ID is an ID which is given to a corresponding physical host when the physical host is started as an instance. Therefore, it can be determined whether or not a corresponding physical host is currently used on the basis of whether or not the instance ID is given thereto.

As a method of acquiring the physical host information, PXE starting may be performed when a new physical host is connected, and hardware information such as a total number of CPUs, a total memory, and a total disk capacity may be automatically acquired by using a starting RAM disk for a registration process which is distributed at the time of the PXE starting. It is assumed here that a command for extracting the hardware information and notifying the physical host managing server of the hardware information is written in the starting RAM disk for a registration process.

In addition, the series of processes is not limited to a physical host, and may be used to acquire information on hardware present under a virtual host.

In the examples illustrated in FIGS. 4 and 5, the host information storage unit 42 stores the host managing node information and the virtual host information regarding the virtual host managing node 81 which is identified by a host managing node ID "VNC-1". According to the host managing node information, it is shown that the virtual host information of the host managing node ID "VNC-1" is updated at the update time "$t_1$". In addition, according to the virtual host information, it is shown that the virtual host managing node 81 identified by the host managing node ID "VNC-1" has 16 CPUs, a memory with a capacity of "32228", and a disk with a capacity of "243", and, 4 CPUs among the CPUs, a memory capacity of "1500", and a disk capacity of "50" are currently used.

In the examples illustrated in FIGS. 4 and 6, the host information storage unit 42 stores the host managing node information and the physical host information regarding the physical host managing node 5 identified by the host managing node ID "PNC-1". According to the host managing node information, it is shown that the virtual host information of the host managing node ID "PNC-1" is updated at an update time "$t_3$". In addition, according to the physical host information, the physical host managing node 7 identified by the host managing node ID "PNC-1" manages three physical hosts identified by the physical host IDs "1001", "1002" and "1003". Further, the physical hosts respectively have "16", "8" and "4" CPUs, memories with capacities of "32228", "32228", and "4096", and disks with capacities of "243", "102", and "100".

Figure 2:
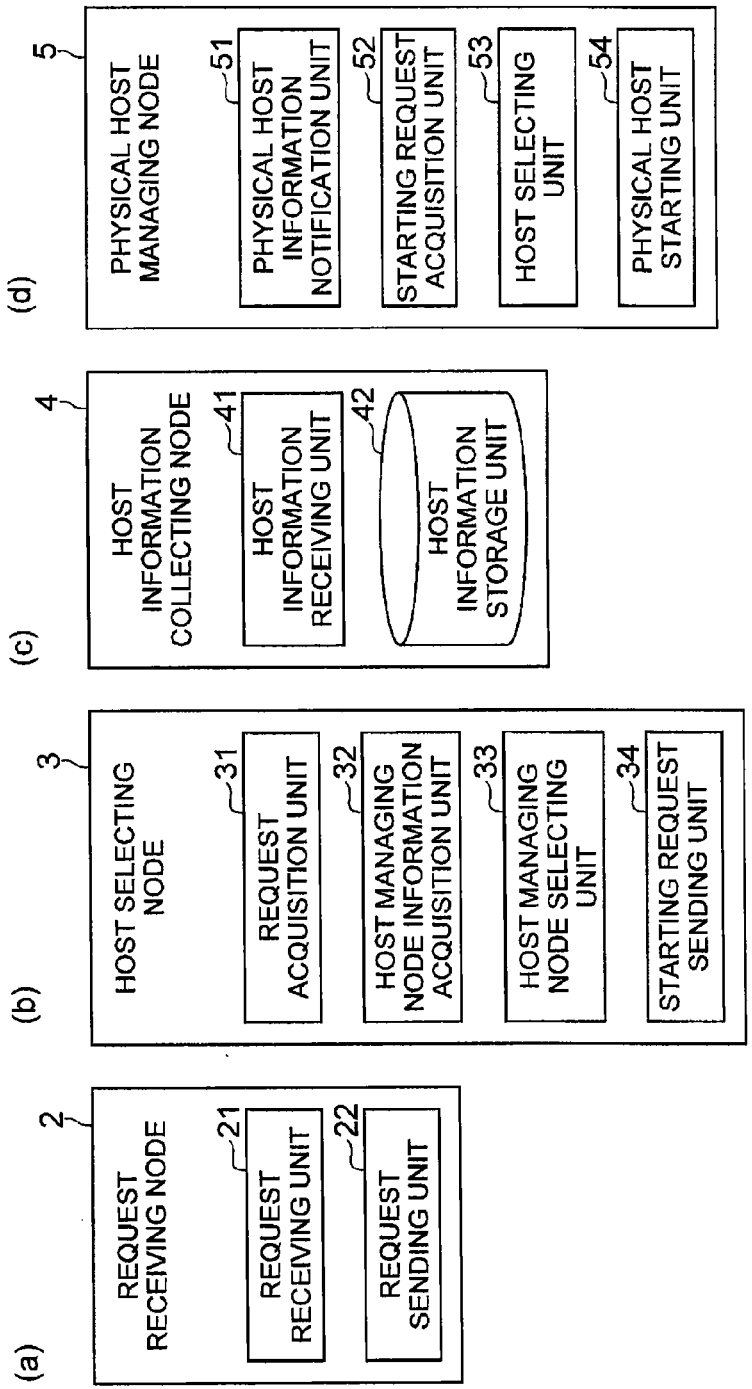
FIG. 2 is a block diagram illustrating functional configurations of a request receiving node, a host selecting node, a host information collecting node, and a physical host managing node.

Next, referring to FIG. 2 again, the host selecting node 3 will be described. FIG. 2(*b*) is a block diagram illustrating a functional configuration of the host selecting node 3. The host selecting node 3 includes a request acquisition unit 31, a host managing node information acquisition unit 32, a host managing node selecting unit 33 (selecting means), and a starting request sending unit 34 (starting request sending means).

The request acquisition unit 31 is a part which acquires the instance starting request sent from the request sending unit 22 of the request receiving node 2.

The host managing node information acquisition unit 32 is a part which acquires information on a host managing node provided in the system by referring to the host information storage unit 42 of the host information collecting node 4. Specifically, for example, the host managing node information acquisition unit 32 acquires all host managing node IDs stored in the host information storage unit 42 in a list form.

The host managing node selecting unit 33 is a part which selects a physical host managing node on the basis of the host managing node information stored in the host information storage unit 42 and host usage state information included in host information from each host managing node in a case where instance type information included in an instance starting request which is received by the request receiving unit 21 indicates a physical instance. Hereinafter, detailed description thereof will be made.

For example, the host managing node selecting unit 33 extracts operable host managing nodes from all host managing nodes included in the system, and generates an operable node list including IDs of the operable host managing nodes. Specifically, the host managing node selecting unit 33 refers to an update time stored in the host managing node information of the host information storage unit 42 in relation to each host managing node included in the list which is acquired by the host managing node information acquisition unit 32. Assuming that the host managing nodes 5 and 81 update host information at time intervals of, for example, 15 seconds, the host managing node selecting unit 33 extracts the host managing nodes 5 and 81 of which elapsed time from an update time to the current time is within 15 seconds, and generates an operable node list including IDs of the extracted host managing nodes. FIG. 7 is a diagram illustrating an example of the operable node list generated by the host managing node selecting unit 33. In the example illustrated in FIG. 7, the host managing node selecting unit 33 extracts host managing nodes identified by "VNC-1", "VNC-2", "PNC-1", "PNC-2", and "PNC-3", and generates an operable node list including host managing node IDs. In addition, the host managing node selecting unit 33 generates the list so that an instance type is correlated with the host managing node ID.

In addition, the host managing node selecting unit 33 extracts host managing nodes matching the instance type information included in the instance starting request, from the operable node list. For example, in a case where instance type information included in the instance starting request indicates a physical instance, the host managing node selecting unit 33 extracts host managing nodes whose instance type is "physical" from the operable node list, so as to generate a suitable node list. FIG. 8 is a diagram illustrating an example of a suitable node list generated by the host managing node selecting unit 33. As illustrated in FIG. 8, the host managing node selecting unit 33 generates a suitable node list formed by IDs "PNC-1", "PNC-2" and "PNC-3" of the host managing nodes whose instance type is "physical".

In addition, the host managing node selecting unit 33 selects the physical host managing node 5 in which the number of physical hosts which are provided to the user terminal $T_U$ as host computers and are currently used among physical hosts under the control thereof is the smallest, by referring to the physical host information stored in the host information storage unit 42. Specifically, from among the physical host managing nodes 5 included in the suitable node list, the host managing node selecting unit 33 selects the physical host managing node 5 in which the number of physical hosts whose instance ID is set in the physical host information stored in the host information storage unit 42 is the smallest.

In the example illustrated in FIG. 6, the number of physical hosts given an instance ID under the control of the physical host managing node 5 as the host managing node "PNC-1" is two, the number of physical hosts given an instance ID under the control of the physical host managing node 5 as the host managing node "PNC-2" is one, and the number of physical hosts given an instance ID under the control of the physical host managing node 5 as the host managing node "PNC-3" is zero. Therefore, the host managing node selecting unit 33 selects the physical host managing node 5 of "PNC-3". Accordingly, since the physical host managing node 5 which is in a low load state is selected, selection of the proper physical host managing node 5 is realized, and load sharing of the entire system is realized. However, the method of selecting the above-described lowest load physical host managing node is an example, and, in order not to use a plurality of physical host managing nodes, a physical host managing node which is in the highest load state and controls a physical host satisfying a request may be selected. In addition, these methods may be used depending on circumstances.

In addition, in a case where the instance type information included in the instance starting request received by the request receiving unit 21 indicates a virtual instance, the host managing node selecting unit 33 may select a virtual host managing node 81 on the basis of the virtual host information stored in the host information storage unit 42. Specifically, the host managing node selecting unit 33 randomly selects a virtual host managing node 81 which satisfies the number of necessary CPUs, a necessary memory, and a necessary disk capacity by referring to the virtual host information illustrated in FIG. 5.

The starting request sending unit 34 is a part which sends an instance starting request to the physical host managing node selected by the host managing node selecting unit 33.

In addition, in a case where the virtual host managing node 81 is selected by the host managing node selecting unit 33, the starting request sending unit 34 may send an instance starting request to the virtual host managing node 81. In this case, the virtual host managing node 81 which acquires the instance starting request can form a virtual instance 85 satisfying necessary performance information in a corresponding second server.

Next, with reference to FIG. 2(*d*), the physical host managing node 5 will be described. FIG. 2(*d*) is a block diagram illustrating a functional configuration of the physical host managing node 5. The physical host managing node 5 functionally includes a physical host state notification unit 51, a starting request acquisition unit 52, a host selecting unit 53 (host selecting means), and a physical host starting unit 54.

The physical host state notification unit 51 is a part which notifies the host information collecting node 4 of physical host information indicating a state of a physical host under the control thereof (refer to FIG. 6).

The starting request acquisition unit 52 is a part which acquires the instance starting request which is sent from the starting request sending unit 34 of the host selecting node 3.

The host selecting unit 53 may select a physical host which has a performance satisfying necessary performance information (the number of CPUs, and the like) included in the instance starting request received by the request receiving unit 21 by referring to a specification (host performance information) of the physical host information. A specific example of the selection process will be described below. In this example, a description will be made of selection of a physical host based on physical host information as illustrated in FIG. 9 in compliance with the instance starting request illustrated in FIG. 3.

First, the host selecting unit 53 extracts "4" which is the number of necessary CPUs of the instance starting request, and excludes a physical host in which the number of CPUs is less than 4 in the physical host information from a selection target. Here, a physical host with a physical host ID of "1010" is excluded.

Next, the host selecting unit 53 extracts the necessary memory capacity "3000" of the instance starting request, and excludes a physical host of which a memory capacity is less than 3000 in the physical host information from a selection target. Here, a physical host with a physical host ID of "1011" is excluded.

Next, the host selecting unit 53 extracts the necessary disk capacity "100" of the instance starting request, and excludes a physical host of which a disk capacity is less than 100 in the physical host information from a selection target. Here, both physical hosts with physical host IDs "1012" and "1013" which remain as a selection target satisfy the condition. Therefore, the host selecting unit 53 selects the physical host with the physical host ID "1012" of which a disk capacity is smaller, of the physical hosts remaining as a selection target.

The physical host starting unit 54 is a part which starts a physical host (physical instance 7) selected by the host selecting unit 53 on the basis of the instance starting request acquired by the starting request acquisition unit 52. Accordingly, a request for a physical host from a user can be defined in detail, and a physical host finely matching the request can be provided.

Figure 10:
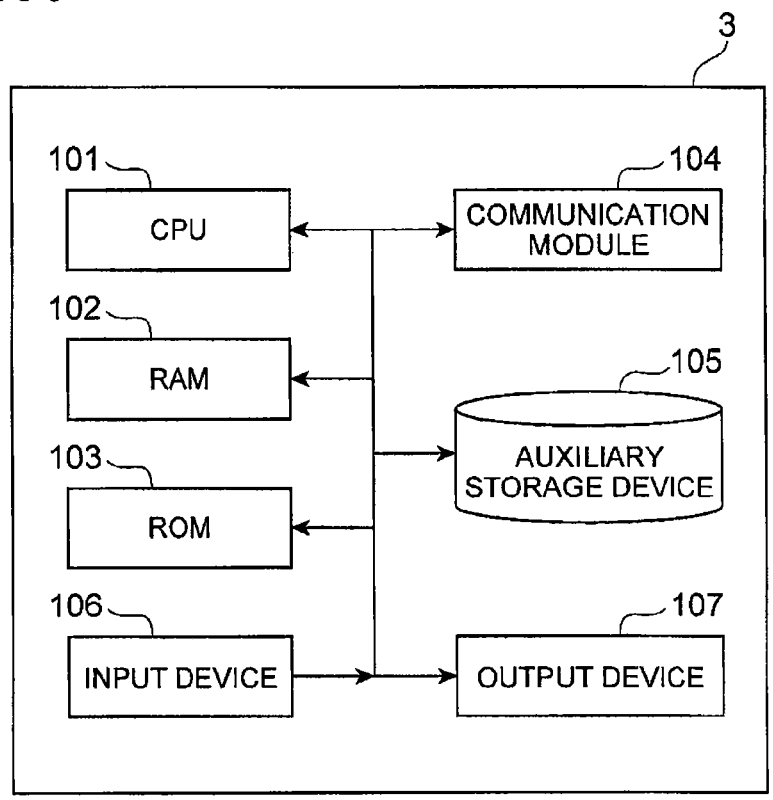
FIG. 10 is a hardware configuration diagram of a server forming one or a plurality of nodes.

One or a plurality of various nodes 2 to 5 illustrated in FIG. 1 may be formed by a single server. FIG. 10 is a hardware configuration diagram of a server forming one or a plurality of nodes. A server forming a node is physically configured as a computer system which includes, as illustrated in FIG. 10, a CPU 101, a RAM 102 and a ROM 103 which are main storage devices, a communication module 104 which is a data transmission and reception device, an auxiliary storage device 105 such as a hard disk or a flash memory, an input device 106 such as a keyboard which is an input device, an output device 107 such as a display, and the like. Predetermined computer software is read on hardware such as the CPU 101 and the RAM 102 illustrated in FIG. 10 so that the communication module 104, the input device 106, and the output device 107 are operated under the control of the CPU 101, and data reading and writing in the RAM 102 or the auxiliary storage device 105 are performed, thereby realizing the respective functions illustrated in FIG. 2.

Next, with reference to FIG. 11, a description will be made of process content performed in a host providing method in the host providing system 1.

First, the request receiving unit 21 of the request receiving node 2 receives an instance starting request from a user terminal, from the user terminal $T_U$. In addition, when the instance starting request is sent from the request sending unit 22, the request acquisition unit 31 of the host selecting node 3 acquires the instance starting request (S1). Next, the host managing node information acquisition unit 32 acquires information on host managing nodes provided in the system by referring to the host information storage unit 42 of the host information collecting node 4 (S2).

Next, the host managing node selecting unit 33 extracts operable host managing nodes from all the host managing nodes included in the system, and generates an operable node list formed by IDs of the operable host managing nodes (S3). Next, the host managing node selecting unit 33 extracts an instance type included in the instance starting request (S4). In addition, the host managing node selecting unit 33 extracts host managing nodes matching the instance type included in the instance starting request from the operable node list so as to generate a suitable node list (S5).

Here, the host managing node selecting unit 33 determines whether or not an instance type of the host managing node included in the suitable node list is "virtual" (S6). If the instance type of the host managing node included in the suitable node list is "virtual", a process procedure proceeds to step S7. On the other hand, if the instance type of the host managing node included in the suitable node list is not "virtual", a process procedure proceeds to step S8.

In step S7, the host managing node selecting unit 33 selects a virtual host managing node 81 on the basis of the host information of a virtual host stored in the host information storage unit 42, and sends the instance starting request to the selected virtual host managing node 81 (S7). The selection of the virtual host managing node 81 is performed by randomly selecting the virtual host managing node 81 matching a condition of a required virtual host, for example, on the basis of the host information stored in the host information storage unit 42. The virtual host managing node 81 to which the instance starting request is sent may form and start a virtual instance having a specification suitable for necessary performance information included in the instance starting request, and may provide the virtual instance to the user terminal $T_U$ as a virtual host. Accordingly, the virtual instance 85 formed in the second server 8 including the virtual host managing node 81 can be provided to a user as a virtual host, and thus a physical instance and a virtual instance can be present in the system in a mixed manner.

In step S8, the host managing node selecting unit 33 acquires the number of physical hosts which are currently used under the control of the physical host managing node 5 included in the suitable node list by referring to the physical host information stored in the host information storage unit 42 (S8). In addition, the host managing node selecting unit 33 extracts a physical host managing node 5 which has the smallest number of physical hosts which are currently used, and physical hosts which are not used (S9).

The starting request sending unit 34 sends the instance starting request to the physical host managing node 5 selected by the host managing node selecting unit 33 (S10). In addition, in step S10, the host selecting unit 53 may select a physical host having a performance satisfying the necessary performance information included in the instance starting request which is received by the request receiving unit 21, from among the physical hosts controlled by the physical host managing node 5 which is selected by the host managing node selecting unit 33, by referring to a specification of the physical host information. Accordingly, the physical host managing node 5 can start a proper physical host. Further, in a case where there is no physical host satisfying the necessary performance information of the instance starting request under the control of the physical host managing node 5 extracted in step S9, another physical host managing node 5 may be re-selected in which the number of physical hosts which are currently used is smallest next to the corresponding physical host managing node 5.

According to the host providing system 10 and the host providing method of the present embodiment, the physical host managing node 5 is provided which controls one or more physical servers and can manage a usage state of a physical host formed in the physical server, and thus the physical server 7 for forming a physical host can be controlled in the system. In addition, according to the present embodiment, in a case where the instance type information included in the instance starting request from the user terminal $T_U$ indicates a physical instance 71, a single physical host managing node 5 which controls a physical server where the physical instance 71 is formed alone is selected, and the instance starting request is sent to the selected physical host managing node 5, depending on usage circumstances of physical hosts. Accordingly, since a physical instance formed in a physical server 7 under the control of the physical host managing node 5 is started as a physical host, it is possible to provide a physical instance 7 complying with a user's request as a physical host.

As mentioned above, the present invention has been described in detail on the basis of the embodiment thereof. However, the present invention is not limited to the embodiment. The present invention may have various modifications within the scope without departing from the spirit thereof.

REFERENCE SIGNS LIST

1 Host providing system, 2 Request receiving node, 3 Host selecting node, 4 Host information collecting node, 5 Physical host managing node, 6 Storage group, 7 First server, 8 Second server, 21 Request receiving unit, 22 Request sending unit, 31 Request acquisition unit, 32 Host managing node information acquisition unit, 33 Host managing node selecting unit, 34 Starting request sending unit, 41 Host information receiving unit, 42 Host information storage unit, 51 Physical host state notification unit, 52 Starting request acquisition unit, 53 Host selecting unit, 54 Physical host starting unit, 71 Physical instance, 81 Virtual host managing node, 85 Virtual instance, $N_C$ Management network, $N_P$ Public network, $T_S$ Maintenance person terminal, $T_U$ User terminal

The invention claimed is:

1. A host providing system for providing an instance constituted by predetermined hardware resources to a user terminal as a host computer so that the instance is available, in compliance with a request from the user terminal, including one or more servers which virtually forms a plurality of virtual instances and provides a virtual instance of the plurality of virtual instances as a virtual host, and including one or more physical servers which provide a physical instance that is physically formed alone in a physical server of the one or more physical servers as a physical host, the system comprising:
- a request receiving unit configured to receive an instance starting request which is a starting request of the instance from the user terminal and includes instance type information indicating whether the instance related to the starting request is either the virtual instance or the physical instance, from the user terminal;
- a host information storage unit configured to store information regarding a state of a host;
- a plurality of physical host managing units configured to control the one or more physical servers, and store physical host information including usage state information indicating a usage state of the physical host formed in the physical server under the control thereof, in the host information storage unit;
- a virtual host managing unit, formed in a server of the one or more servers that provides the virtual host, configured to store virtual host information including information indicating a usage state of the virtual host in the host information storage unit;
- a selecting unit configured to select one of the physical host managing units on the basis of usage state information included in the physical host information from each of the physical host managing units, stored in the host information storage unit, when the instance type information included in the instance starting request received by the request receiving unit indicates the physical instance; and
- a starting request sending unit configured to send the instance starting request to the physical host managing unit selected by the selecting unit.

2. The host providing system according to claim 1,
wherein the instance starting request includes necessary performance information indicating a performance of hardware which is necessary in the instance,
wherein the physical host information includes host performance information indicating a performance of hardware of each physical instance forming a corresponding physical host,
wherein the host providing system further includes
a host selecting unit configured to select the physical host having a performance satisfying the necessary performance information included in the instance starting request received by the request receiving unit from among physical hosts which are controlled by the physical host managing unit selected by the selecting unit, by referring to the host performance information of the physical host information stored in the host information storage unit, and
wherein the starting request sending unit sends the instance starting request for starting the physical host selected by the host selecting unit to the physical host managing unit selected by the host selecting unit.

3. The host providing system according to claim 1,
wherein the selecting unit selects the physical host managing unit in which a number of physical hosts which are provided as host computers and are currently used is the smallest among the physical hosts under the control thereof, by referring to the usage state information included in the physical host information stored in the host information storage unit.

4. The host providing system according to claim 1,
wherein the instance starting request includes necessary performance information indicating a performance of hardware which is necessary in the instance,
wherein the physical host information includes host performance information indicating a performance of hardware of each physical instance forming a corresponding physical host, and
wherein the selecting unit selects the physical host managing unit which has physical hosts that satisfy a performance indicated by the host performance information under the control thereof and that are not used, and in which the number of physical hosts which are provided as host computers and are currently used is the largest among the physical hosts under the control thereof, by referring to the usage state information and the host performance information included in the physical host information stored in the host information storage unit.

5. The host providing system according to claim 1,
wherein the instance starting request includes at least one of a number of CPUs, a memory capacity, and a storage capacity, which are necessary in the instance, as necessary performance information, and
wherein the physical host information includes at least one of a number of CPUs, a memory capacity, and a storage capacity forming a corresponding physical host, as host performance information.

6. The host providing system according to claim 1,
wherein the selecting unit selects the virtual host managing unit on the basis of the virtual host information stored in the host information storage unit, when the instance type information included in the instance starting request received by the request receiving unit indicates the virtual instance, and
wherein the starting request sending unit sends the instance starting request to the virtual host managing unit selected by the selecting unit.

7. A host providing method in a host providing system for providing an instance constituted by predetermined hardware resources to a user terminal as a host computer so that the instance is available, in compliance with a request from the user terminal, including one or more servers which virtually forms a plurality of virtual instances provides a virtual instance as a virtual host, and including one or more physical servers which provide a physical instance that is physically formed alone in a physical server of the one or more physical servers as a physical host, the method comprising:
- a request receiving step of receiving an instance starting request which is a starting request of the instance from the user terminal and includes instance type information indicating whether the instance related to the starting request is either the virtual instance or the physical instance, from the user terminal;
- a selecting step of selecting one of a plurality of physical host managing units, implemented by first circuitry, on the basis of usage state information included in physical host information from each of the physical host managing units, stored in a host information storage, when the instance type information included in the instance starting request received in the request receiving step indicates the physical instance; and
- a starting request sending step of sending the instance starting request to the physical host managing unit selected in the selecting step,
wherein the host providing system includes
the host information storage configured to store information regarding a state of a host;
the plurality of physical host managing units configured to control the one or more physical servers, and storing physical host information including usage state information indicating a usage state of the physical host formed in the physical server under the control thereof, in the host information storage; and a virtual host managing unit, implemented by second circuitry and formed in a server of the one or more servers providing the virtual host, configured to store virtual host information including information indicating a usage state of the virtual host in the host information storage.

8. The host providing method according to claim 7, wherein the instance starting request includes necessary performance information indicating a performance of hardware which is necessary in the instance, wherein the physical host information includes host performance information indicating a performance of hardware of each physical instance forming a corresponding physical host, wherein the host providing method further includes a host selecting step of selecting the physical host having a performance satisfying the necessary performance information included in the instance starting request received in the request receiving step from among the physical hosts which are controlled by the physical host managing unit selected in the selecting step, by referring to the host performance information of the physical host information stored in the host information storage, and wherein, in the starting request sending step, the instance starting request for starting the physical host selected in the host selecting step is sent to the physical host managing unit selected in the selecting step.

9. A host providing system for providing an instance constituted by predetermined hardware resources to a user terminal as a host computer so that the instance is available, in compliance with a request from the user terminal, including one or more servers which virtually forms a plurality of virtual instances and provides a virtual instance of the plurality of virtual instances as a virtual host, and including one or more physical servers which provide a physical instance that is physically formed alone in a physical server of the one or more physical servers as a physical host, the system comprising:

request receiving circuitry configured to receive an instance starting request which is a starting request of the instance from the user terminal and includes instance type information indicating whether the instance related to the starting request is either the virtual instance or the physical instance, from the user terminal;

a host information storage configured to store information regarding a state of a host;

a plurality of physical host managing circuitry configured to control the one or more physical servers, and store physical host information including usage state information indicating a usage state of the physical host formed in the physical server under the control thereof, in the host information storage;

virtual host managing circuitry, formed in a server of the one or more servers that provides the virtual host, configured to store virtual host information including information indicating a usage state of the virtual host in the host information storage;

selecting circuitry configured to select one of the physical host managing circuitry on the basis of usage state information included in the physical host information from each of the physical host managing circuitry, stored in the host information storage, when the instance type information included in the instance starting request received by the request receiving circuitry indicates the physical instance; and starting request sending circuitry configured to send the instance starting request to the physical host managing circuitry selected by the selecting circuitry.

10. The host providing system according to claim 9, wherein the instance starting request includes necessary performance information indicating a performance of hardware which is necessary in the instance, wherein the physical host information includes host performance information indicating a performance of hardware of each physical instance forming a corresponding physical host, wherein the host providing system further includes host selecting circuitry configured to select the physical host having a performance satisfying the necessary performance information included in the instance starting request received by the request receiving circuitry from among physical hosts which are controlled by the physical host managing circuitry selected by the selecting circuitry, by referring to the host performance information of the physical host information stored in the host information storage, and wherein the starting request sending circuitry sends the instance starting request for starting the physical host selected by the host selecting circuitry to the physical host managing circuitry selected by the host selecting circuitry.

11. The host providing system according to claim 9, wherein the selecting circuitry selects the physical host managing circuitry in which a number of physical hosts which are provided as host computers and are currently used is the smallest among the physical hosts under the control thereof, by referring to the usage state information included in the physical host information stored in the host information storage.

12. The host providing system according to claim 9, wherein the instance starting request includes necessary performance information indicating a performance of hardware which is necessary in then instance, wherein the physical host information includes host performance information indicating a performance of hardware of each physical instance forming a corresponding physical host, and wherein the selecting circuitry selects the physical host managing circuitry which has physical hosts that satisfy a performance indicated by the host performance information under the control thereof and that are not used, and in which a number of physical hosts which are provided as host computers and are currently used is the largest among the physical hosts under the control thereof, by referring to the usage state information and the host performance information included in the physical host information stored in the host information storage.

13. The host providing system according to claim 9, wherein the instance starting request includes at least one of a number of CPUs, a memory capacity, and a storage capacity, which are necessary in the instance, as necessary performance information, and wherein the physical host information includes at least one of a number of CPUs, a memory capacity, and a storage capacity forming a corresponding physical host, as host performance information.

14. The host providing system according to claim 9, wherein the selecting circuitry selects the virtual host managing circuitry on the basis of the virtual host information stored in the host information storage, when the instance type information included in the instance starting request received by the request receiving circuitry indicates the virtual instance, and wherein the starting request sending circuitry sends the instance starting request to the virtual host managing circuitry selected by the selecting circuitry.

\* \* \* \* \*